United States Patent
Lee et al.

(10) Patent No.: US 7,264,751 B2
(45) Date of Patent: Sep. 4, 2007

(54) YELLOW ZNS-BASED PHOSPHOR, PROCESS OF PREPARING THE SAME AND DISPLAY DEVICE USING THE PHOSPHOR

(75) Inventors: Sanghyuk Lee, Anyang (KR); Sanghoon Shin, Suwon (KR); Yongchan You, Anyang (KR); Joayoung Jeong, Seongnam (KR)

(73) Assignee: Samsung SDI Co., Ltd., Suwon-si (KR)

( * ) Notice: Subject to any disclaimer, the term of this patent is extended or adjusted under 35 U.S.C. 154(b) by 397 days.

(21) Appl. No.: 10/368,385

(22) Filed: Feb. 20, 2003

(65) Prior Publication Data
US 2004/0100185 A1    May 27, 2004

(30) Foreign Application Priority Data
Nov. 27, 2002   (KR) .................. 10-2002-0074357

(51) Int. Cl.
*H01J 29/20*    (2006.01)
*C09K 11/56*    (2006.01)

(52) U.S. Cl. .................. 252/301.6 S; 313/495
(58) Field of Classification Search .................... None
See application file for complete search history.

(56) References Cited

U.S. PATENT DOCUMENTS 2,743,237 A * 4/1956 Froelich ............... 252/301.6 S
3,507,805 A * 4/1970 Lehmann .............. 252/301.6 S
3,957,678 A * 5/1976 Dikhoff et al. ....... 252/301.6 S

FOREIGN PATENT DOCUMENTS

JP              62-201990       9/1987

OTHER PUBLICATIONS

U.S. Appl. No. 10/368,341, filed Feb. 20, 2003, Lee et al., Samsung SDI Co., Ltd.

* cited by examiner

*Primary Examiner*—C. Melissa Koslow
(74) *Attorney, Agent, or Firm*—Stein, McEwen & Bui, LLP

(57) ABSTRACT

A yellow ZnS-based phosphor having improved color coordinates and luminance for use in intermediate- and low-voltage display devices using improved activators and coactivators has color coordinates (x, y) shifting to a yellow emission as the amount of an activator is increased. Therefore, the ZnS: (Au or Cu), In phosphor can be advantageously utilized for various display applications including vacuum fluorescent displays (VFDs) and field emission displays (FEDs).

10 Claims, 2 Drawing Sheets

YELLOW ZNS-BASED PHOSPHOR, PROCESS OF PREPARING THE SAME AND DISPLAY DEVICE USING THE PHOSPHOR

CROSS-REFERENCE TO RELATED APPLICATION

This application claims the benefit of Korean Application No. 02-74357, filed Nov. 27, 2002 in the Korean Intellectual Property Office, the disclosure of which is incorporated herein by reference.

BACKGROUND OF THE INVENTION

1. Field of the Invention

The present invention relates to a yellow ZnS-based phosphor, a process of preparing the same and a display device using the phosphor. More particularly, the present invention relates to a yellow phosphor achieved by a ZnS-based host material having improved color coordinates and luminance for use in intermediate- and low-voltage display devices, a process of preparing the same, and a display device using the phosphor.

2. Description of the Related Art

Representative intermediate- and low-voltage display devices include vacuum fluorescent displays (VFDs) and field emission displays (FEDs). Like cathode ray tubes (CRTs), VFDs are self-radiating displays using phosphors, and are widely used, for example, as digital displays of household electric appliances and gauge panels of automobiles. Until recently, VFDs have mainly been used in low-capacity, small-sized products to simply display numbers, characters, and signs. However, VFDs are currently in use as high-density graphic image displays. In the near future, a full color VFD having a large display capacity will be commercially viable.

FEDs have received considerable attention as a next generation display device having the advantages of flat panel displays, such as liquid crystal displays (LCDs), and CRTs. Thus, a great deal of research on FEDs continues to be actively conducted. FEDs, which operate on the principle of field emission of electrons from microscopic tips, are known to be capable of overcoming the drawbacks of CRTs, such as excessive bulk and weight, and the drawbacks of LCDs, such as high manufacturing cost, limited size and viewing angle. Furthermore, since FEDs have various advantages such as a thin film form, low power consumption, low manufacturing cost, excellent temperature characteristics, and high-speed operation, FEDs have a wide variety of applications ranging from home televisions to industrial equipment and computers. In particular, FEDs are likely to be widely used in commercial applications such as notebook PCs, monitors, and televisions, like thin film transistor (TFT) LCDs.

ZnS-based phosphors currently being used include a ZnS: Ag, Cl phosphor, a ZnS: Ag, Al phosphor, a ZnS: Cu, Al phosphor, a ZnS: Cu, Au, Al phosphor, and a ZnS: Mn phosphor. In particular, the ZnS: Mn, Ag or Cu phosphor is suitably used for intermediate- and low-voltage display devices and has color coordinates corresponding to blue and orange emission colors. However, unlike the blue and orange emission colors, a yellow emission color, which is a characteristic color, leads to a wide range of applications. Since there is an increasing demand for yellow phosphors, the yellow ZnS-based phosphor is open for improvement in the color coordinates.

SUMMARY OF THE INVENTION

The present invention provides a ZnS-based phosphor having improved color coordinates while not containing cadmium that is harmful to the human body, by using improved activators.

The present invention also provides a process of preparing the ZnS-based phosphor having improved color coordinates.

Further, the present invention provides a display device using the ZnS-based phosphor having improved color coordinates.

According to an aspect of the present invention, there is provided an Ag or Cu, In activated ZnS-based ZnS: (Au or Cu), In phosphor with color coordinates (x, y) falling within a triangular region defined by (0.45, 0.55), (0.45, 0.44) and (0.55, 0.44) and having Au or Cu as a first activator and In as a second activator.

According to another aspect, the ZnS: (Au or Cu), In phosphor has color coordinates (x, y) falling within a triangular region defined by (0.46, 0.54), (0.46, 0.45) and (0.54, 0.45).

According to yet another aspect, the ZnS: (Au or Cu), In phosphor has color coordinates (x, y) falling within a triangular region defined by (0.46, 0.54), (0.48, 0.46) and (0.54, 0.45).

According to still another aspect, the Au or the Cu is a first activator in an amount of $1 \times 10^{-6}$ to 1 mol % per mole of a ZnS host material.

According to still yet another aspect, the Au or the Cu is added in an amount of $1 \times 10^{-4}$ to $1 \times 10^{-1}$ mol % per mole of a ZnS host material.

According to a further aspect, the In is added as a second activator in an amount of 0.001 to 5 mol % per mole of a ZnS host material.

According to a yet further aspect, the In is added in an amount of 0.01 to 2 mol % per mole of a ZnS host material.

According to an additional aspect of the present invention, there is provided a process of preparing a ZnS: (Au or Cu), In phosphor, the process including blending a ZnS host materials, Au or Cu as a first activator and In as a second activator, with water, and stirring to produce a mixture, drying and pulverizing the mixture to acquire fine particles, and sintering the fine particles at 800 to 1100° C. under a mild reducing atmosphere for 1 to 6 hours.

According to a yet additional aspect, the sintering temperature is preferably in the range of 850 to 1000° C.

According to a still additional aspect of the present invention, there is provided an intermediate- and low-voltage display device using the phosphor.

BRIEF DESCRIPTION OF THE DRAWINGS

The above and/or other aspects and/or advantages of the present invention will become more apparent and more readily appreciated by describing in detail embodiments thereof with reference to the accompanying drawings in which.

DETAILED DESCRIPTION OF THE EMBODIMENTS

Figure 1:
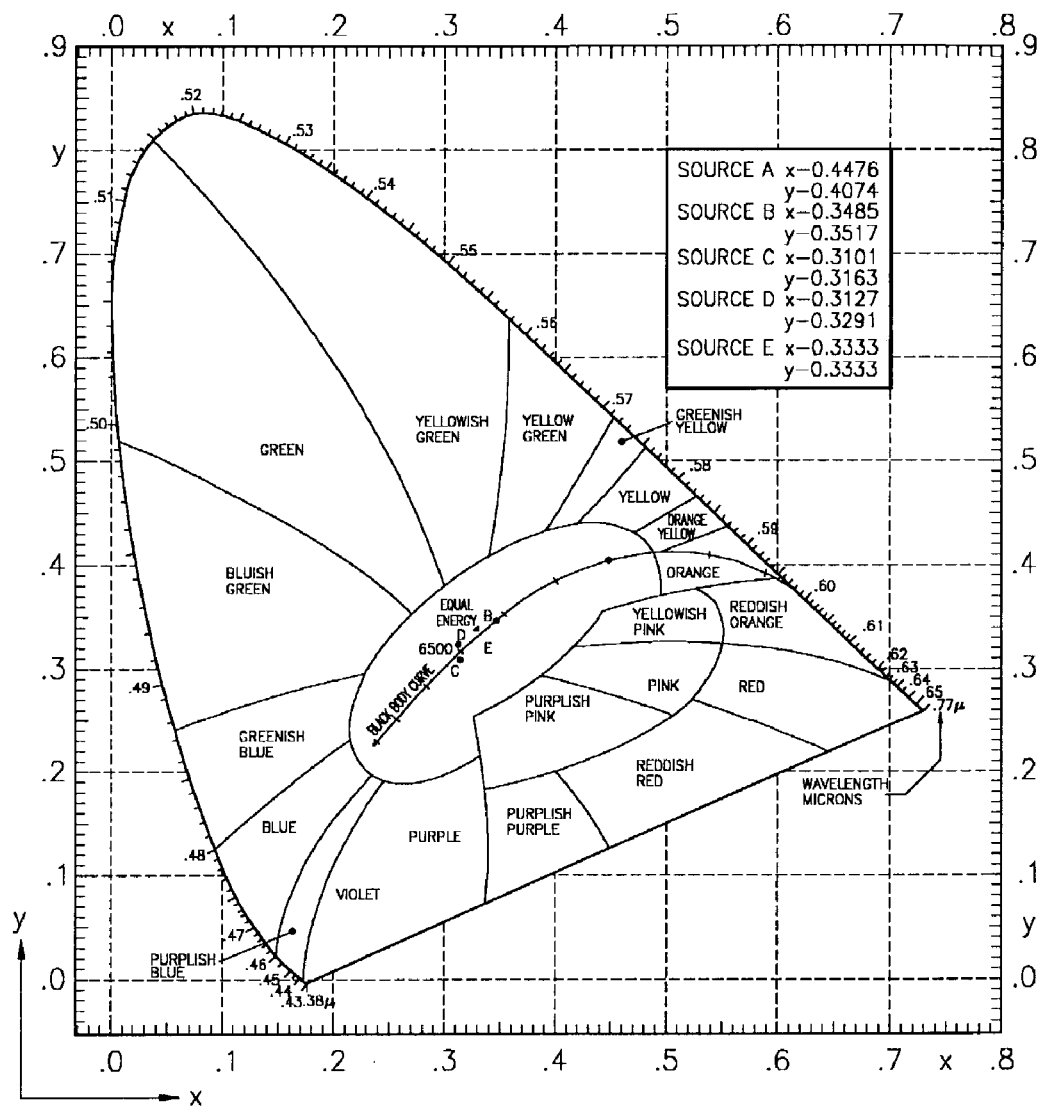
FIG. 1 is a CIE chromaticity diagram.

Reference will now be made in detail to the present embodiments of the present invention, examples of which are illustrated in the accompanying drawings and in specific Examples, wherein like reference numerals refer to the like elements throughout. The embodiments are described below in order to explain the present invention by referring to the figures and specific Examples.

In order to improve color purity of a conventional ZnS-based phosphor, and to control emission color, the present invention provides a highly advantageous yellow phosphor by improving the color coordinates of a ZnS-based phosphor. In order to provide a yellowish hue, gold (Au) or copper (Cu) is added as a first activator and indium (In) is added as a second activator, thereby improving the color purity. The addition of the Au or the Cu as the first activator and the In as the second activator creates a donor and acceptor in the ZnS as a host material, thereby realizing a more stable emission.

As shown in the CIE chromaticity diagram of FIG. 1, the ZnS: (Au or Cu), In phosphor according to an embodiment of the present invention has color coordinates (x, y) within a triangular area defined by (0.45, 0.55), (0.45, 0.44) and (0.55, 0.44). While not required, the ZnS: (Au or Cu), In phosphor has color coordinates (x, y) falling within a triangular region defined by (0.46, 0.54), (0.46, 0.45) and (0.54, 0.45), and preferably has color coordinates (x, y) falling within a triangular region defined by (0.46, 0.54), (0.48, 0.46) and (0.54, 0.45) according to an embodiment of the invention.

In order to enhance the color purity of the ZnS phosphor according to an embodiment of the present invention, the Au or the Cu is added as the first activator in an amount of $1 \times 10^{-6}$ to 1 mol % per mole of ZnS, and preferably $1 \times 10^{-4}$ to $1 \times 10^{-1}$ mol %. If the amount of the first activator added is too small (i.e., not greater than $1 \times 10^{-6}$ mol %), a desired effect is difficult to attain. Meanwhile, if the amount of the first activator added is greater than 1 mol %, there occurs an undesirable deterioration in the performance of the phosphor due to a change in the emission color or concentration quenching.

The In may be added as the second activator in an amount of 0.001 to 5 mol % per mole of a ZnS host material, and preferably 0.01 to 2 mol %, according to an embodiment of the invention. If the amount of the second activator added is too small (i.e., not greater than 0.001 mol %), a desired effect is difficult to attain. Meanwhile, if the amount of the second activator added is greater than 5 mol %, undesired emission characteristics (such as a decrease in the luminance or a change in color coordinates) occur due to concentration quenching.

The ZnS phosphor according to an embodiment of the present invention is prepared by blending a ZnS host material, Au or Cu as a first activator and In as a second activator, with water, and stirring to give a mixture, drying and pulverizing the mixture in an alumina mortar to acquire fine particles, and sintering the fine particles at 800 to 1100° C. under a mild reducing atmosphere for 1 to 6 hours. The sintering temperature is preferably in the range of 850 to 1000° C., but may be other temperatures in other aspects.

The mild reducing atmosphere can be created by singly using carbon or using carbon and sulfur gas in combination.

In the above-described process, the Au or the Cu and the In used as the first and second activators, respectively, are not specifically limited in their forms and may be elemental, oxide, hydroxide or salt, such as nitrate, sulfate or chlorate.

If necessary, various fluxes (e.g., halide) can be used. Examples thereof include, but are not limited to, barium chloride, sodium iodide, ammonium iodide, potassium iodide, ammonium chloride and aluminum fluoride.

According to various embodiments, the present teachings encompass a display device comprising a vacuum envelope within a container, and an electron source and a phosphor layer disposed in the vacuum envelope. The phosphor layer includes a phosphor which collides with electrons emitted from the electron source to emit light, with the phosphor being a ZnS: (Au or Cu), In phosphor with color coordinates (x, y) falling within a triangular region defined by (0.45, 0.55), (0.45, 0.44) and (0.55, 0.44), and having Au or Cu as a first activator and In as a second activator. According to another aspect of the present invention, there is provided intermediate and low-voltage display devices, such as vacuum fluorescent displays (VFDs) and field emission displays (FEDs), using the phosphor of the present invention.

Figure 2:
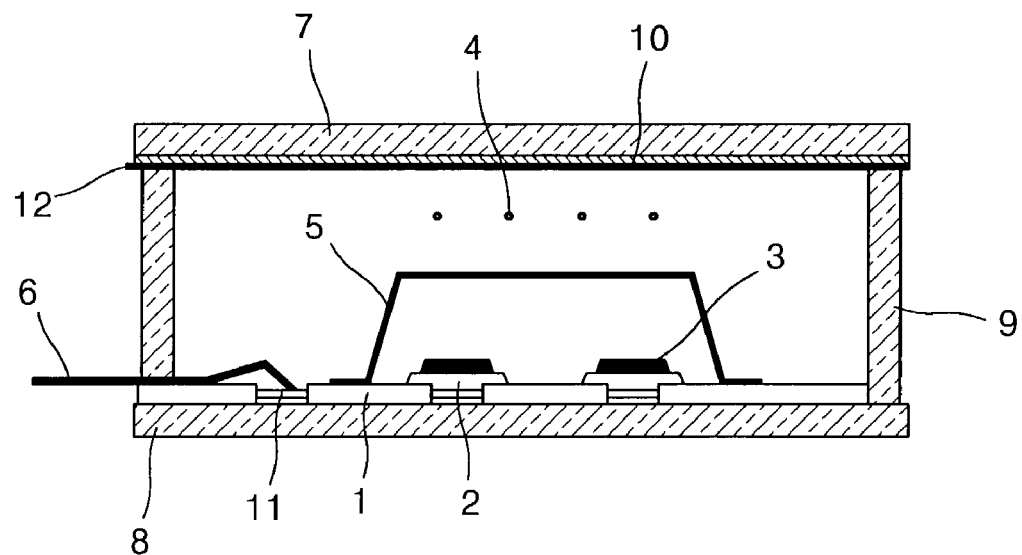
FIG. 2 is a cross-sectional view of a vacuum fluorescent display (VFD) using a phosphor of an embodiment of the present invention.

FIG. 2 shows the structure of a VFD in which an insulator layer 1, an anode 2, phosphors 3, filaments 4, a grid 5 and a lead output terminal 6 are provided in a vacuum envelope. In FIG. 2, a transparent conductive layer 10, a silver wire 11 and a seal glass 12 are also used. The VFD is enclosed by a faceplate 7, a backplate 8 and sideplates 9, made of glass, and is basically configured such that the grid 5, the insulator layer 1 and the anode 2 are formed between the frontplate 7 and the backplate 8 by printing and heating processes. The frontplate 7 serves to allow the envelope to be kept at a vacuum state and prevents static electricity from being externally applied. The phosphors 3 for the VFD emit light by electrons emitted from the filaments 4 as electron sources in a vacuum state. The filaments 4 are generally formed by coating barium oxide on tungsten to thus emit thermal electrons when they are heated according to applied power. The lead output terminal 6 is used to supply power to the filaments 4, the grid 1 and the anode 7 and is led outside the vacuum envelope to a power supply (not shown). One of the phosphors 3 includes the phosphor of the present invention.

Figure 3:
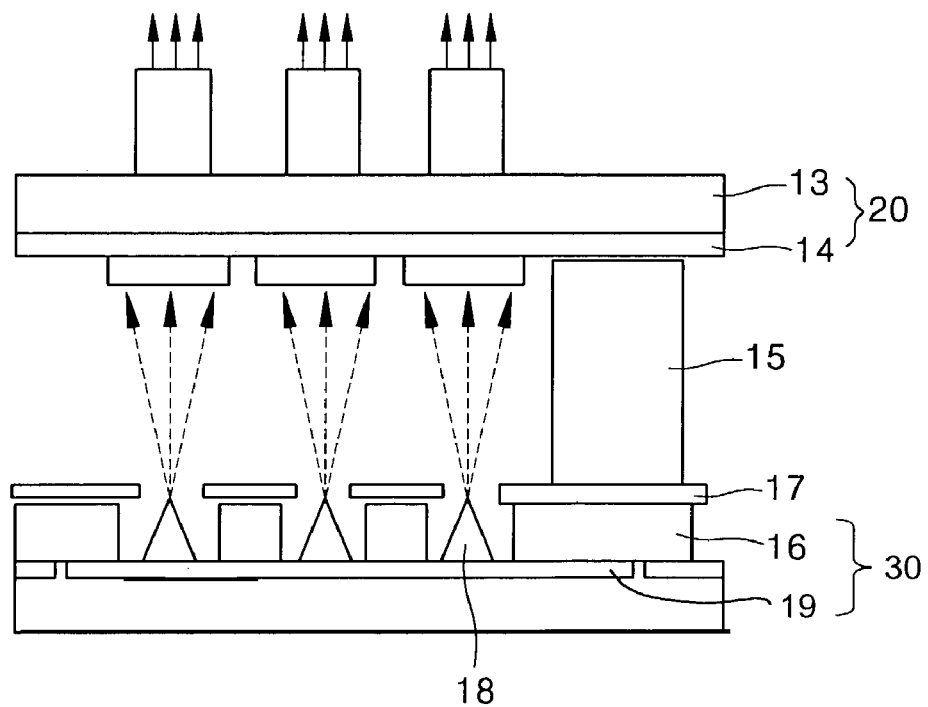
FIG. 3 is a cross-sectional view of a portion of a field emission display (FED) using the phosphor of an embodiment of the present invention.

FIG. 3 is a cross-sectional view of a portion of a general field emission display (FED). As shown in FIG. 3, the FED includes an anode 20, a cathode 30 and a small vacuum gap maintained by a spacer 15 interposed therebetween within a vacuum envelope. In FIG. 3, a gate insulator 16 and an emitter 18, respectively are used. The anode 20 has a glass plate 13 and an indium tin oxide (ITO) plate 14. The cathode 30 has a cathode plate 19 and a gate 17. The anode 20 and the cathode 30 are spaced apart from each other by the vacuum gap. The anode 20 is coated with phosphors and is disposed at the upper portion of the vacuum gap, and the cathode 30 is disposed at the lower portion of the gap. Row and column electrodes arranged on the cathode 30 allow field emitter arrays (FEAs) to be matrix-addressed to emit electrons from the FEAs during a time period in which a voltage is applied to the gate 17. The electrons are accelerated by an anode voltage toward the phosphors coated on the anode 20 via the vacuum gap and collide with pixels of the phosphors, exciting them to emit light. One of the phosphors includes the phosphor of the present invention.

Hereinafter, embodiments of the present invention will be described in detail. However, it is understood that the scope of this invention is not restricted to the described embodiments.

EXAMPLE 1

1 mol of ZnS, $6 \times 10^{-3}$ mol % of Au and 0.01 mol % of $In_2O_3$ were put into a beaker, mixed with 200 mL of water, stirred, and dried in a dryer. The dried mixture was put into an alumina mortar and ground to obtain fine particles. The obtained fine particles were sintered at 950° C. for 3 hours to give 80 g of a ZnS: Au, In phosphor.

Color coordinates of the obtained phosphor were measured under 365 nm excitation and the results thereof are listed in Table 1.

EXAMPLES 2-16

The same procedure as in Example 1 was carried out except that ZnS, Au and $In_2O_3$ were used in amounts varying as listed in Table 1, to obtain ZnS: Au, In phosphors.

The color coordinates of the obtained phosphors were measured and the results thereof are listed in Table 1.

TABLE 1

|  | ZnS (mol) | Au (mol %) | $In_2O_3$ (mol %) | Color coordinates |
|---|---|---|---|---|
| Example 1 | 1 | 0.006 | 0.6 | x = 0.4728, y = 0.5038 |
| Example 2 | 1 | 0.024 | 0.6 | x = 0.4808, y = 0.4989 |
| Example 3 | 1 | 0.042 | 0.6 | x = 0.4966, y = 0.4867 |
| Example 4 | 1 | 0.006 | 0.6 | x = 0.5121, y = 0.4744 |
| Example 5 | 1 | 0.006 | 0.8 | x = 0.4860, y = 0.4947 |
| Example 6 | 1 | 0.024 | 0.8 | x = 0.4893, y = 0.4924 |
| Example 7 | 1 | 0.042 | 0.8 | x = 0.5047, y = 0.4806 |
| Example 8 | 1 | 0.06 | 0.8 | x = 0.5228, y = 0.4655 |
| Example 9 | 1 | 0.006 | 1.0 | x = 0.4927, y = 0.4890 |
| Example 10 | 1 | 0.024 | 1.0 | x = 0.4996, y = 0.4843 |
| Example 11 | 1 | 0.042 | 1.0 | x = 0.5130, y = 0.4735 |
| Example 12 | 1 | 0.06 | 1.0 | x = 0.5317, y = 0.4577 |
| Example 13 | 1 | 0.006 | 1.2 | x = 0.5069, y = 0.4780 |
| Example 14 | 1 | 0.024 | 1.2 | x = 0.5110, y = 0.4746 |
| Example 15 | 1 | 0.042 | 1.2 | x = 0.5282, y = 0.4604 |
| Example 16 | 1 | 0.06 | 1.2 | x = 0.5393, y = 0.4512 |

As shown in Table 1, the ZnS: Au, In phosphor according to the present invention has color coordinates corresponding to a yellow emission color in the CIE chromaticity diagram shown in FIG. 1. Referring to Table 1, in Examples 1-4 with a fixed amount of the In added as the second activator and the amount of the Au added as the first activator increased, the x-coordinate is increased and the y-coordinate is increased, which is also applicable to Examples 5-16. Also, in Examples 1, 5, 9 and 13, with a fixed amount of the Au added as the first activator and the amount of the In added as the second activator varying, the x-coordinate is increased and the y-coordinate is decreased, which is also applicable to the other examples. Thus, it is confirmed that the Au and the In used as activators in the present invention considerably affect the color coordinates of a phosphor using ZnS as a host material, making the ZnS: Au, In phosphor have color coordinates corresponding to a pure yellow emission.

EXAMPLE 17

1 mol of ZnS, $3 \times 10^{-3}$ mol % of $Cu(NO_3)_2 \cdot 9H_2O$, and 0.8 mol % of $In_2(SO_4)_3 \cdot 9H_2O$ were put into a beaker, mixed with 200 mL of water, stirred, and dried in a dryer. The dried mixture was put into an alumina mortar and ground to obtain fine particles. The obtained fine particles were sintered at 950° C. for 3 hours to give 98 g of a ZnS: Cu, In phosphor.

Color coordinates of the obtained phosphor were measured under 365 nm excitation and the results thereof are listed in Table 2.

EXAMPLES 18-20

The same procedure as in Example 17 was carried out except that ZnS, $Cu(NO_3)_2 \cdot 9H_2O$, and $In_2(SO_4)_3 \cdot 9H_2O$ were used in amounts varying as listed in Table 2, to obtain ZnS: Cu, In phosphors.

The color coordinates of the obtained phosphors were measured under 365 nm excitation and the results thereof are listed in Table 2.

TABLE 2

|  | ZnS (mol) | $Cu(NO_3)_2 \cdot 9H_2O$ (mol %) | $In_2(SO_4)_3 \cdot 9H_2O$ (mol %) | Color coordinates |
|---|---|---|---|---|
| Example 17 | 1 | 0.003 | 0.8 | x = 0.4854, y = 0.4918 |
| Example 18 | 1 | 0.003 | 0.6 | x = 0.4859, y = 0.4885 |
| Example 19 | 1 | 0.003 | 0.4 | x = 0.4937, y = 0.4807 |
| Example 20 | 1 | 0.006 | 0.6 | x = 0.4809, y = 0.4919 |

As shown in Table 2, the Cu, In activated ZnS phosphor according to the present invention has color coordinates corresponding to a pure yellow emission in the CIE chromaticity diagram shown in FIG. 1.

COMPARATIVE EXAMPLE 1

1 mol of ZnS, and 3 mol % of Mn were put into a beaker, mixed with 200 mL of water, stirred, and dried in a dryer. The dried mixture was put into an alumina mortar and ground to obtain fine particles. The obtained fine particles were sintered at 950° C. for 3 hours to give 80 g of a ZnS: Mn phosphor. For light emitted by the ZnS: Mn phosphor, the x-coordinate is 0.55 and the y-coordinate is 0.43, which means that the emission color is substantially orange.

As described above, compared to the conventional phosphor, the phosphor according to the present invention has enhanced color coordinates and luminance while not containing cadmium, which is harmful to the human body. Therefore, the ZnS: Au, In phosphor according to the present invention can be advantageously utilized for various display applications including vacuum fluorescent displays (VFDs) and field emission displays (FEDs).

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A process of preparing a ZnS: (Au or Cu), In phosphor, comprising:

blending a ZnS host material, Au or Cu as a first activator and In as a second activator, with water, and stirring to produce a mixture;

drying and pulverizing the mixture to acquire fine particles; and sintering the fine particles at 800 to 1100° C. under a mild reducing atmosphere for at or between 1 and 6 hours.

2. An intermediate and low voltage display device comprising:

a vacuum envelope within a container; and an electron source and a phosphor layer disposed in the vacuum envelope, wherein the phosphor layer includes a phosphor which collides with electrons emitted from the electron source to emit light, the phosphor being a ZnS: (Au or Cu), In phosphor with color coordinates (x, y) falling within a triangular region defined by (0.45, 0.55), (0.45, 0.44) and (0.55, 0.44) and having Au or Cu as a first activator and In as a second activator,
wherein the In is added as the second activator in an amount at or between 0.01 and 5 mol % per mole of a ZnS host material.

3. The display device of claim 2, wherein the display device is a vacuum fluorescent display.

4. The display device of claim 2, wherein the display device is a field emission display.

5. The display of claim 2, wherein the In is added as the second activator in an amount at or between 0.01 and 2 mol % per mole of a ZnS host material.

6. The display of claim 2, wherein the first activator is the Cu.

7. The vacuum fluorescent display of claim 3, wherein the In is added as the second activator in an amount at or between 0.01 and 2 mol % per mole of a ZnS host material.

8. The vacuum fluorescent display of claim 3, wherein the first activator is the Cu.

9. The field emission display of claim 4, wherein the In is added as the second activator in an amount at or between 0.01 and 2 mol % per mole of a ZnS host material.

10. The field emission display of claim 4, wherein the first activator is the Cu.

* * * * *